US009258693B2

(12) United States Patent
Stouder-Studenmund (10) Patent No.: US 9,258,693 B2
(45) Date of Patent: Feb. 9, 2016

(54) DEVICE CENTRIC OR INTERACTIVE DISCOVERY

(71) Applicant: Apple Inc., Cupertino, CA (US)

(72) Inventor: William R. Stouder-Studenmund, Bonita, CA (US)

(73) Assignee: Apple Inc., Cupertino, CA (US)

( * ) Notice: Subject to any disclaimer, the term of this patent is extended or adjusted under 35 U.S.C. 154(b) by 155 days.

(21) Appl. No.: 13/673,678

(22) Filed: Nov. 9, 2012

(65) Prior Publication Data

US 2014/0134947 A1    May 15, 2014

(51) Int. Cl.
*H04W 8/00* (2009.01)
*H04W 4/00* (2009.01)
*H04L 29/08* (2006.01)

(52) U.S. Cl.
CPC ............. *H04W 8/005* (2013.01); *H04L 67/14* (2013.01); *H04W 4/008* (2013.01)

(58) Field of Classification Search
None
See application file for complete search history.

(56) References Cited

U.S. PATENT DOCUMENTS

| 7,656,847 | B2 | 2/2010 | Mela et al. | |
| 2010/0015919 | A1 | 1/2010 | Tian | |
| 2010/0190440 | A1* | 7/2010 | Kim | 455/41.2 |
| 2011/0028093 | A1 | 2/2011 | Patel et al. | |
| 2011/0171903 | A1 | 7/2011 | Toebes | |
| 2011/0275316 | A1* | 11/2011 | Suumaki et al. | 455/41.1 |
| 2012/0137346 | A1 | 5/2012 | Lee et al. | |
| 2012/0322368 | A1* | 12/2012 | Desai et al. | 455/41.1 |

OTHER PUBLICATIONS

Bluetooth, Bluetooth Specification 4.0, vol. 1, 2010.*
YouTube, how to pair your iPhone 4 to your Bluetooth Headset, 2010 https://www.youtube.com/watch?v=kyOliO6woxY.*
Bluetooth, Bluetooth Core_V4.0, 2010.*

* cited by examiner

*Primary Examiner* — Ping Hsieh
*Assistant Examiner* — James Yang
(74) *Attorney, Agent, or Firm* — Downey Brand LLP (57) ABSTRACT

Methods and apparatus are provided for discovering computing devices in a local area. A method includes receiving, by a first device, a request to provide discovery information, generating, by the first device, the discovery information, wherein the discovery information includes a communication address of the first device, and providing, by the first device, the discovery information using a short-range protocol that can be received only within a defined distance of the first device. The method can further include receiving, by a second device, the discovery information, wherein the second device is located within the defined distance of the first device, extracting, by the second device, the communication address of the first device from the discovery information, and initiating, by the second device, communication with the first device using the communication address and a communication protocol associated with the address.

20 Claims, 8 Drawing Sheets

DEVICE CENTRIC OR INTERACTIVE DISCOVERY

TECHNICAL FIELD

The present invention relates generally to communication between computing devices. More particularly, the present embodiments relate to discovery by one computing device of other computing devices, and/or establishment of communication between different computing devices.

BACKGROUND

Numerous useful features of portable computing devices rely on the ability of the devices to communicate information to and receive information from other computing devices. Wireless networking, in particular, provides portable computing devices with the ability to access information available on the Internet, send and receive messages to other users, send and receive a user's documents and information to and from other computing devices, and so on. Computing devices often use communication techniques such as cellular data, WiFi™, and the like to communicate with other devices. These communication techniques ordinarily require that an address, Uniform Resource Locator (URL), or other identifying information be known about the other device with which communication is to be established. These addresses are readily obtainable in some cases, e.g., for devices that have Domain Name Service (DNS) names, such as a web server accessible via the URL. However, there are many devices that do not have their own URLs or have URLs, but the URLs are not known to users who wish to access the devices. Even if a list of the available devices is available, there may be a large number of devices, and selecting the best one from a long list can be difficult. In other cases, devices do not have URLs, and are discovered using a protocol such as Bluetooth®.

For example, an Apple TV® device, available from Apple® Inc. of Cupertino, Calif., provides an interface from a computing device to a television. Mobile devices, such as smart phones, can use the Apple TV to display images on the television. However, establishing a connection between a mobile device and a wireless television devices (e.g., Apple TV or like), or wireless printer (e.g., using AirPrint® or the like) may require that the device user be registered in a certain way, which may not be the case in some environments such as classrooms. In another example, there are many devices, e.g., 20,000 or more, in an area such as an auditorium, arena, or the like. Identifying the device of a particular person can be difficult, because an attempt to connect to another device is likely to involve selecting the other device from a large list of devices.

SUMMARY

The present application describes various embodiments regarding techniques that can be used to enable a computing device to discover other nearby computing devices. A nearby computing device can be, for example, a device located within a distance sufficiently close to allow a person at the location of the first device to see, hear, touch, or otherwise be informed of the existence or identity of the nearby device. The discovery information can be used to establish communication with the discovered device via existing protocols such as HTTP, TCP/IP, and the like.

Embodiments described herein provide device discovery features by providing or transmitting discovery information from a "server" device via a short-range communication protocol such as Bonjour® (an implementation of the Zeroconf protocol available from Apple, Inc. as the Bonjour® protocol), Bluetooth®, Infrared Data Association (IrDA®), optical barcode display and recognition, or the like. Since the discovery information sent by the server can only be received within a limited range, only users who are located within that range of the server see the server as an available device on their own devices. The discovery information provided by the server can include one or more URL's (Uniform Resource Locators) that reference the server and/or its services, or other information that identifies the server or a service provided by the server. In one or more embodiments, the server device provides the discovery information in response to a user pressing a physical button on the device, or selecting a graphical user interface element in a user interface displayed on a screen of the server, or by otherwise interacting with the server.

In one or more embodiments, methods and apparatus to discover computing devices in a local area are provided. In one aspect, devices are discovered by receiving, by a first device, a request to provide discovery information, generating, by the first device, the discovery information, wherein the discovery information includes a communication address of the first device, and providing, by the first device, the discovery information using a short-range protocol that can be received only within a defined distance of the first device.

Embodiments can include one or more of the following features. Receiving the request to provide discovery information can include detecting physical interaction with the first device by a user. The physical interaction can include pressing a button located on the device. The short-range protocol can use optical image recognition, and generating the discovery information can include generating an image based upon the communication address of the first device, and providing the discovery information comprises displaying the image on a display of the first device. The short-range protocol can use near-field communication, and receiving a request to provide discovery information can include receiving a request to establish a near-field communication channel from a second device located in close proximity to the first device, generating the discovery information comprises generating near-field communication data that includes the communication address of the first device, and providing the discovery information comprises transmitting the discovery information to the second device via a near-field communication data exchange.

The short-range protocol can use Bluetooth-based communication, and receiving the request to provide discovery information can include detecting physical interaction with the first device by a user, generating the discovery information comprises generating data in a Bluetooth format, wherein the data includes the communication address of the first device, and providing the discovery information comprises transmitting the discovery information to the second device via Bluetooth without Bluetooth pairing between the first and second devices. The short-range protocol can use Bonjour-based communication, and generating the discovery information can include generating data in a Bonjour format, wherein the data includes the communication address of the first device in a Bonjour record, and providing the discovery information comprises transmitting the discovery information to the second device via the Bonjour protocol.

In another aspect, devices are discovered by receiving, by a second device, the discovery information, wherein the second device is located within the defined distance of the first device, extracting, by the second device, the communication address of the first device from the discovery information, and initiating, by the second device, communication with the first device using the communication address and a communication protocol associated with the address.

Embodiments can include one or more of the following features. The short-range protocol can uses optical image recognition, and receiving the discovery information can include optically recognizing an image displayed on the first device, and extracting the communication address can include decoding the image and identifying the communication address and communication protocol based upon the decoded image. The short-range protocol can use near-field communication, and receiving the discovery information can include receiving near-field communication data from the first device, and extracting the communication address comprises decoding the communication address from the near-field communication data. The short-range protocol can use Bluetooth-based communication, receiving the discovery information can include receiving Bluetooth data from the first device without a pairing between the first and second devices, and extracting the communication address can include decoding the discovery information from the Bluetooth data. The short-range protocol can use Bonjour-based communication, and receiving the discovery information can include receiving Bonjour protocol data from the first device, and extracting the communication address comprises decoding the discovery information from the Bonjour protocol data.

In another aspect, devices are discovered by sending, from a client device, a request for discovery information to a server device located within a defined distance of the client device, receiving, at the client device, discovery information from the server device, extracting, at the client device, a communication address of the server device from the discovery information, and initiating communication with the server device using the communication address and a communication protocol associated with the address. The server device can receive a request to provide discovery information, generate the discovery information, wherein the discovery information includes a communication address of the server device, and provide the discovery information using a short-range protocol that can be received only within a defined distance of the server device.

BRIEF DESCRIPTION OF THE DRAWINGS

The included drawings are for illustrative purposes and serve only to provide examples of possible structures and arrangements for the disclosed inventive apparatuses and methods for providing portable computing devices. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements, and in which.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The following relates to a portable computing device such as a laptop computer, net book computer, tablet computer, etc. The portable computing device can include a multi-part housing having a top case and a bottom case joining at a reveal to form a base portion. The portable computing device can have an upper portion (or lid) that can house a display screen and other related components whereas the base portion can house various processors, drives, ports, battery, keyboard, touchpad and the like. The base portion can be formed of a multipart housing that can include top and bottom outer housing components each of which can be formed in a particular manner at an interface region such that the gap and offset between these outer housing components are not only reduced, but are also more consistent from device to device during the mass production of devices. These general subjects are set forth in greater detail below.

In one or more embodiments, a computing device can discover other nearby computing devices that have made discovery information accessible to the first computing device. A nearby computing device can be, for example, a device located within a distance sufficiently close to allow a person at the location of the first device to see, hear, touch, or otherwise be informed of the existence or identity of the nearby device. The discovery information can subsequently be used to establish communication with the discovered device via existing protocols such as HTTP, TCP/IP, and the like.

Embodiments described herein provide device discovery features by providing or transmitting discovery information from a "server" device via a short-range communication protocol such as Zero configuration networking (Zeroconf, implemented in devices available from Apple, Inc. as the Bonjour protocol), Bluetooth, IRDA, or the like. Bonjour provides a way to find devices with which to communicate. Bonjour does not itself transfer data communication packets from one device to another. Since the discovery information sent by the server can only be received within a limited range, only users who are located within that range of the server see the server as an available device on their own devices. The discovery information provided by the server can include one or more URL's (Uniform Resource Locators) that reference the server and/or its services, or other information that identifies the server or a service provided by the server. In one or more embodiments, the server device provides the discovery information in response to a user pressing a physical button on the device, or selecting a graphical user interface element in a user interface displayed on a screen of the server, or by otherwise interacting with the server. The button or user interface element may be labeled "Discover Me," for example. Thus, when a user of a portable device presses the Discover Me operation on a server device such as a television interface device, a printer, a projector, or the like, the server device provides, e.g., transmits, discovery information, using a communication protocol or method that can only be received within a limited distance of the server device. Since the user is close enough to the device to touch it, the user's portable device is within range of the communication, and receives the discovery information, which can be displayed on the portable device and selected by the user to establish communication between the portable device and the server. In another embodiment, the server can provide the discovery information in response to detection of a proximity device or card, or detection of motion using a motion sensor similar to those used for interior or exterior lighting.

Figure 1:
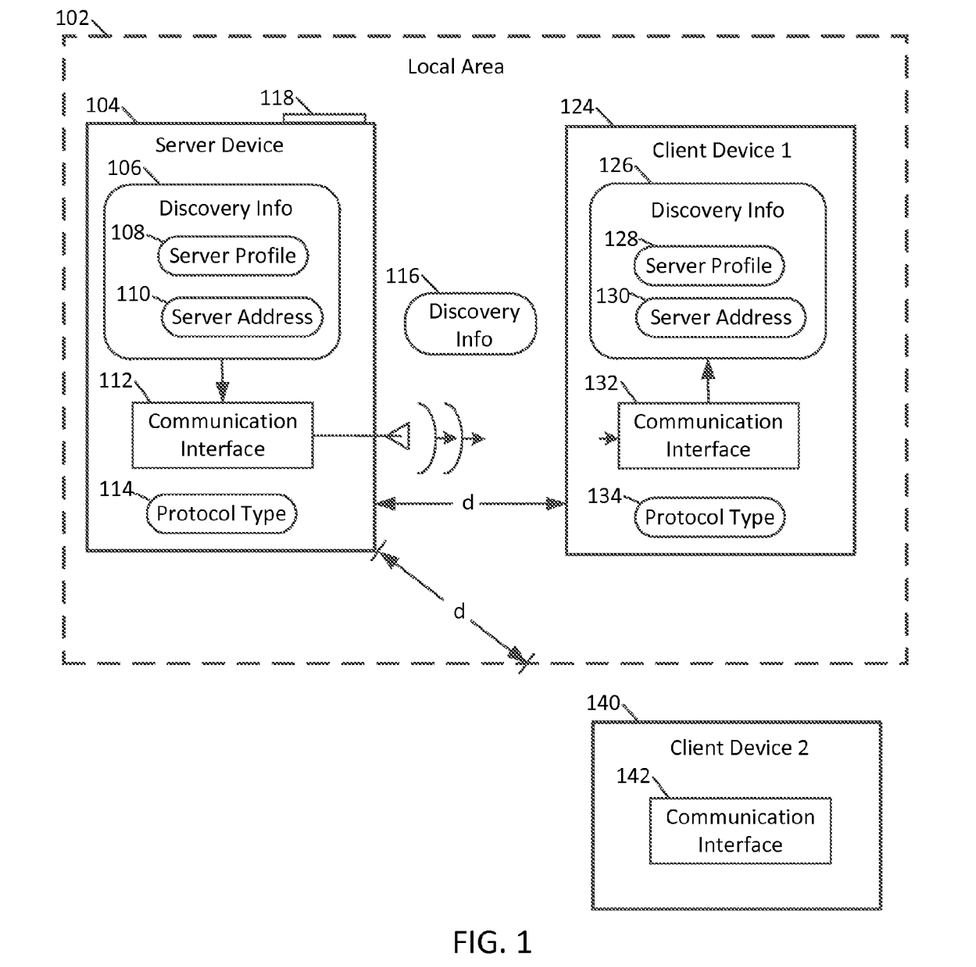
FIG. 1 is a representative diagram showing discovery of nearby devices in accordance with one or more embodiments.

FIG. 1 is a representative diagram showing discovery of nearby devices in accordance with one or more embodiments. A server device 104 has a communication interface 112, which can communicate, e.g., send and receive data, to and from another communication interface 132 of a client device 124. The communication devices 112, 132 can be, for example, transmitters and receivers used in protocols such as Bonjour, Zeroconf, Bluetooth, IrDA, Near-Field Communication (NFC), or the like. The communications devices 112, 132 can also use optical image display and recognition, e.g., by displaying QR barcode images on the server device 104, and using a camera or other optical lens-based detector to recognize the optical image on the client device 124. The Bonjour protocol is ordinarily layered on top of IP (the Internet Protocol) in networking stacks.

A local area 102, which can be, for example, a room, an auditorium, and outdoor space, or the like, has a defined size that is based upon a range of a communication protocol used by the server device 104. The range is illustrated by the distance d in FIG. 1, so that devices outside the local area are located at a distance greater than the range of the communication protocol. Although a single specific value of the distance d is not ordinarily known, there is ordinarily a maximum distance beyond which the light or other electromagnetic radiation emitted by the communication interface 112 of the server 104 is not detectable or discernible by the other communication interface 132 in another device, such as the client device 124. Therefore, a defined distance d can be identified, at least as an upper maximum value of the communication range of the protocol used by the interfaces 112, 132. In other examples, d can be an average of two or more distances in a range of distances associated with the communication interfaces. For example, if the range of the NFC protocol associated with the communication interfaces 112, 132, e.g., by a specification or their manufacturer, is 8-10 cm, then the defined distance d can be any of 8 cm, 10 cm, the average of 8 and 10 cm, or any specified value greater than the protocol range, such as 20 cm.

As introduced above, the communication interfaces 112, 132 use one or more particular protocols. The protocols that are or can be used are identified by protocol type values 114, 134. For example, if the Bonjour protocol is being used, then the protocol type would be a value associated with the Bonjour protocol. The server 104 includes discovery information 106, which identifies the server. The discovery information 106 includes a server profile 108 that specifies details such as a name of the server, capabilities or characteristics of the server, services provided by the server, and the like. The discovery information 106 also includes a server address 110, which is a network address at which the server or a service provided by the server can be reached, e.g., a URL, domain name address, IP address, Bonjour address, or other type of address associated with the protocol type 114.

In one or more embodiments, the server device 104 provides, e.g., transmits or displays, the discovery information 106 using the communication interface 112 and the protocol specified by the protocol type 114. The protocol type 114 can be included in the discovery information. The server 104 can provide the discovery information 106 using multiple protocols, e.g., by sending the discovery information 106 using each type of protocol in succession. For example, a device that provides visual output, e.g., an Apple TV, or a display on a scanner or printer, and also supports NFC can enable both optical and NFC discovery. In one embodiment, the server 104 sends the discovery information 106 automatically, e.g., periodically, at certain times, in response to certain events, or upon receiving a discovery request via the communication interface 112. In another embodiment, the server 104 sends the discovery information 106 when a user touches the device, e.g., by pressing a button 118 labeled Discover Me on the device, or by other physical interaction with the device, such as touching the device with the client device 124, speaking to the device 104, and so on.

In one embodiment, when the server 104 provides or transmits the discovery information 106, the communication interface 112 makes a representation 116 of the discovery information is made available for detection by other devices 124. Devices within the defined range d of the server device 104, such as the client device 124, detect and receive the discovery information 116 via the client communication interface 132, and construct a discovery information representation 126 that can be used to initiate and establish communication with the server 104. The client device 124 can use the server address 130 in the received discovery information 124 to initiate or open a communication session or send a message to the server 104, depending on the particular protocol to be used. In one example, the protocol to be used is specified in the received discovery information 126. In another example, the protocol to be used is the same protocol on which the communication interface 132 received the discovery information 126. The protocol to be used to initiate the communication can be, for example, HTTP, TCP, UDP, IP, WiFi, a cellular data protocol such as EDGE, UMTS, LTE, and so on. Thus, the discovery information 126 received by the client device 124 enables the client device to identify and communicate with the server device 104. Authentication and other communication configuration can be performed as part of the subsequent establishment of communication between the server 104 and client 124.

In one embodiment, the discovery information 116 is not detected or received by a second client device 140, because a communication interface 142 in the second client device 140 is beyond the range, e.g., the defined distance d, of the protocol that server device 104 used to transmit or otherwise provide the discovery information 116. For example, the second client device 140 may be located in a different room than the service device 104, or in the same room but at a distance beyond that at which the signal produced by the communication interface 112 can be detected. In another example, devices, including those that are within the defined range of the server device 104, such as the client device 124, do not receive the discovery information 116 if there is an obstruction, such as a physical object, located between the server 104 and the client 124 that interferes with the signal, or other form of interference with the signal. However, since users of the client device 124 can be located near the server device 104, users are likely to be able to see the server device 104 and identify and remove such obstructions, or physically move the server 104 and/or client 124 as appropriate to reduce the interference.

Figure 2:
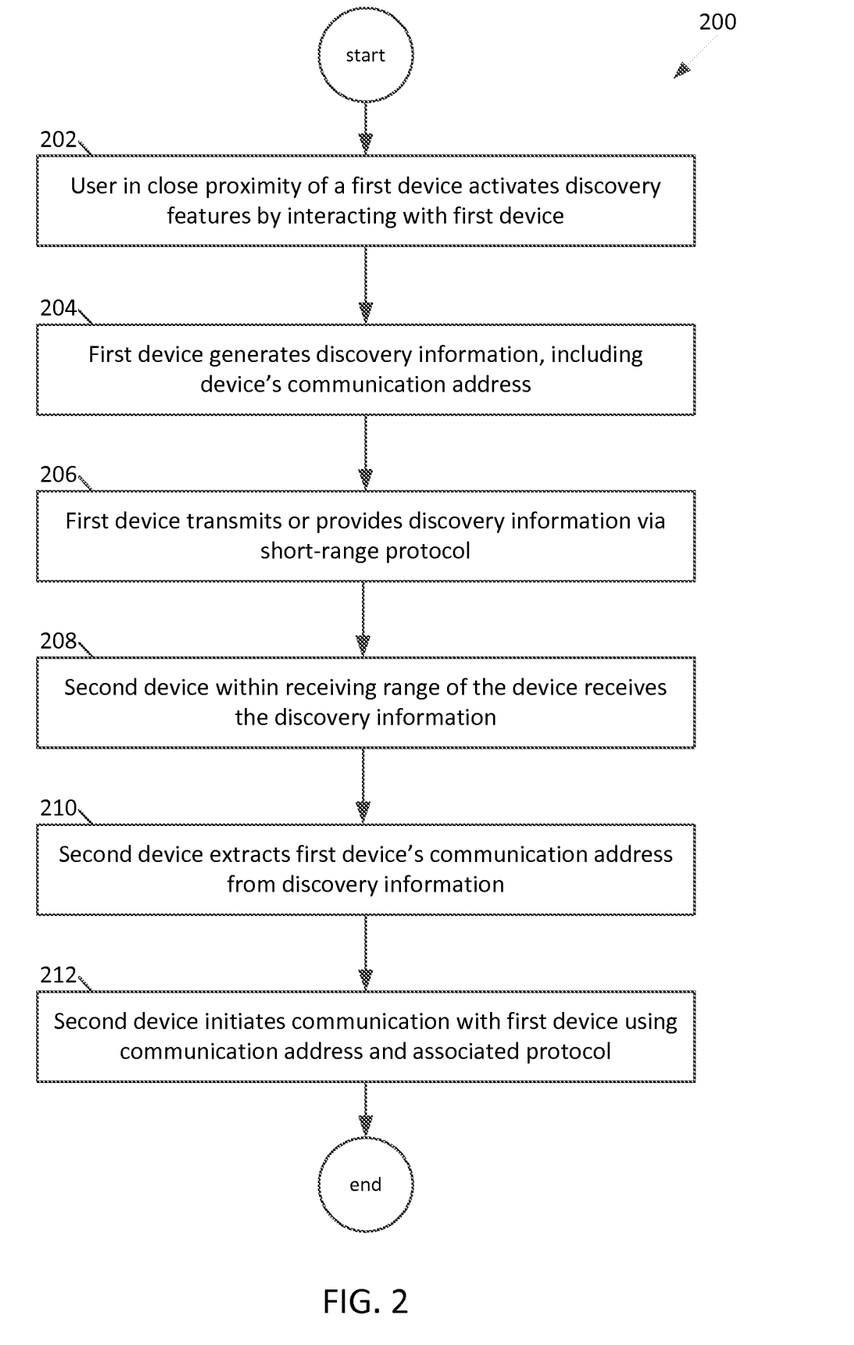
FIG. 2 illustrates a device discovery process in accordance with one or more embodiments.

FIG. 2 illustrates a device discovery process 200 in accordance with one or more embodiments. Process 200 can be implemented as, for example, computer program code encoded on a computer readable medium and executable by a processor of a computer system, by processors of two or more computer systems. In on example, as shown in FIG. 2, the device discovery process 200 can broadcast information that can be detected by clients to discover the server. The process begins at block 202, in which a user in close proximity of a first device, such as a server 104, interacts with the device, e.g., by physically pressing a button 118 on the device. The physical user interaction is one way to begin the discovery process, but other ways are possible as well. Therefore, block 202 is optional, and the process can begin at block 204, which can be executed in response to an event such as another type of discovery request received by a different communication protocol, a query received from a second device 124, or by a periodic timer, or other type of event.

At block 204, the first device generates discovery information 106, e.g., by storing the server profile 108 and server address 110 in the discovery information 106. The server address 110 can be an address in the format of a service protocol, such as HTTP, TCP/IP, or the like, via which the server receives communication requesting its services, such as receiving documents to print, receiving video to display, transmitting image data, and the like. The service protocol can be determined by other devices from the address 110, or the service protocol can be included in the discovery information 106. At block 206, the first device transmits, broadcasts, or otherwise provides the discovery information 116 via a short-range protocol such as Bonjour, Bluetooth, NFC, QR images, and so on, as introduced above. A second device within receiving range of the first device detects and receives the discovery information 116 to create discovery information 126 in a memory of the second device 124 at block 208. In one aspect, the second device 124 is located within a defined distance of the first device, such as at a distance less than a maximum range of the communication protocol used to transmit the discovery information 116. In one aspect, devices beyond the range of the communication protocol do not detect the discovery information 116, so the dissemination of the discovery information 116 is limited to devices within the local area 102. In one or more other embodiments, instead of broadcasting the discovery information, the first device receives a query from the second device 124 at block 202, and sends the discovery information at block 204 to the second device 245 in response to the query.

At block 210, the second device 124 extracts the first device's communication address 130 from the received discovery information 126. Then, at block 212, the second device 124 initiates communication with the first device 104 using the communication address 130 and the protocol associated with the communication address 130, or a protocol specified in the discovery information 126. In one example, the second device 124 can determine whether to initiate communication with the first device 104 based upon the server profile data 128 received by the second device 124. For example, if the profile data 128 indicates that the first device 104 (i.e., the server) does not provide the service that the second device 124 is searching for, then the second device 124 need not initiate a connection to the second device 104. The second device 124 can decide not to initiate a connection for other reasons as well, e.g., if the response time from the first device 104 is greater than a threshold, or if the protocol of the server address 130 is not supported by the communication interface 132 of the second device 124. Once communication with the second device has been initiated, the process 200 ends.

Figure 3:
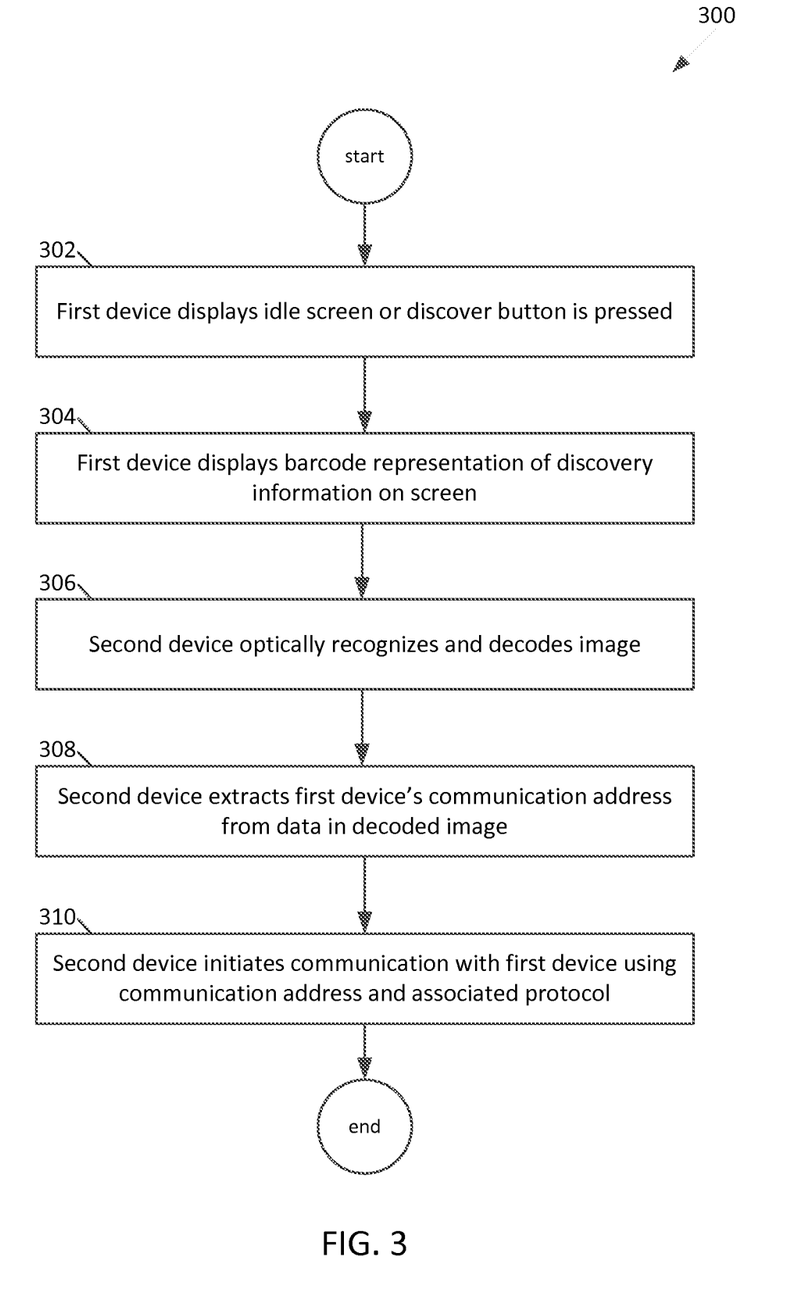
FIG. 3 illustrates a process of discovering nearby devices using a short-range optical protocol in accordance with one or more embodiments.

FIG. 3 illustrates a process 300 of discovering nearby devices using a short-range optical protocol in accordance with one or more embodiments. Process 300 can be implemented as, for example, computer program code encoded on a computer readable medium and executable by a processor of a computer system. The optical protocol can, for example, display a Quick Response code (QR) code that represents the discovery information on the server, and use optical image recognition on the client to decode the QR barcode images. This, in an optical protocol, the discovery information includes an image based upon the communication address of the first device. The first device provides the discovery information at by displaying the image on a display, such as an LCD or CRT screen located on or near the first device. Printers and laptop computers, for example, have screens on which the image can be displayed. The QR codes can be displayed on an idle screen that appears when the printer's user interface has been inactive for a period of time, or when selected via a menu interface, or when a Discover Me or other button 118 is pressed on the front of the device (block 302). A QR code can also be displayed on a kiosk computer used for Podcast Capture in a lecture room. In one aspect, displaying the data needed for a QR code supporting device discovery may place a requirement on the minimum screen resolution. For example, a Version 10 QR code can have 57 by 57 pixels, and can convey 395 alphanumeric characters, which are expected to be sufficient to represent multiple instance of the discovery information. The QR code, e.g., a barcode image, is displayed on a screen or other display device of the first device (block 304).

The second device can receive the QR-format discovery information by optically recognizing an image displayed on the first device using a camera and lens with QR image scanning software or hardware (block 306). The QR-based discovery protocol can be used by a computer that has an integrated camera, such as a laptop or desktop computer, including computers with detachable screens that can be waved in from the of the computer, so that the user need not wave the computer in front of the device. The discovery information can be extracted by decoding the information in the recognized image and retrieving the communication address and communication protocol from that recognized information (block 308). The second device then initiates communication with the first device using the communication address and protocol extracted from the image (block 310), and the process ends.

Figure 4:
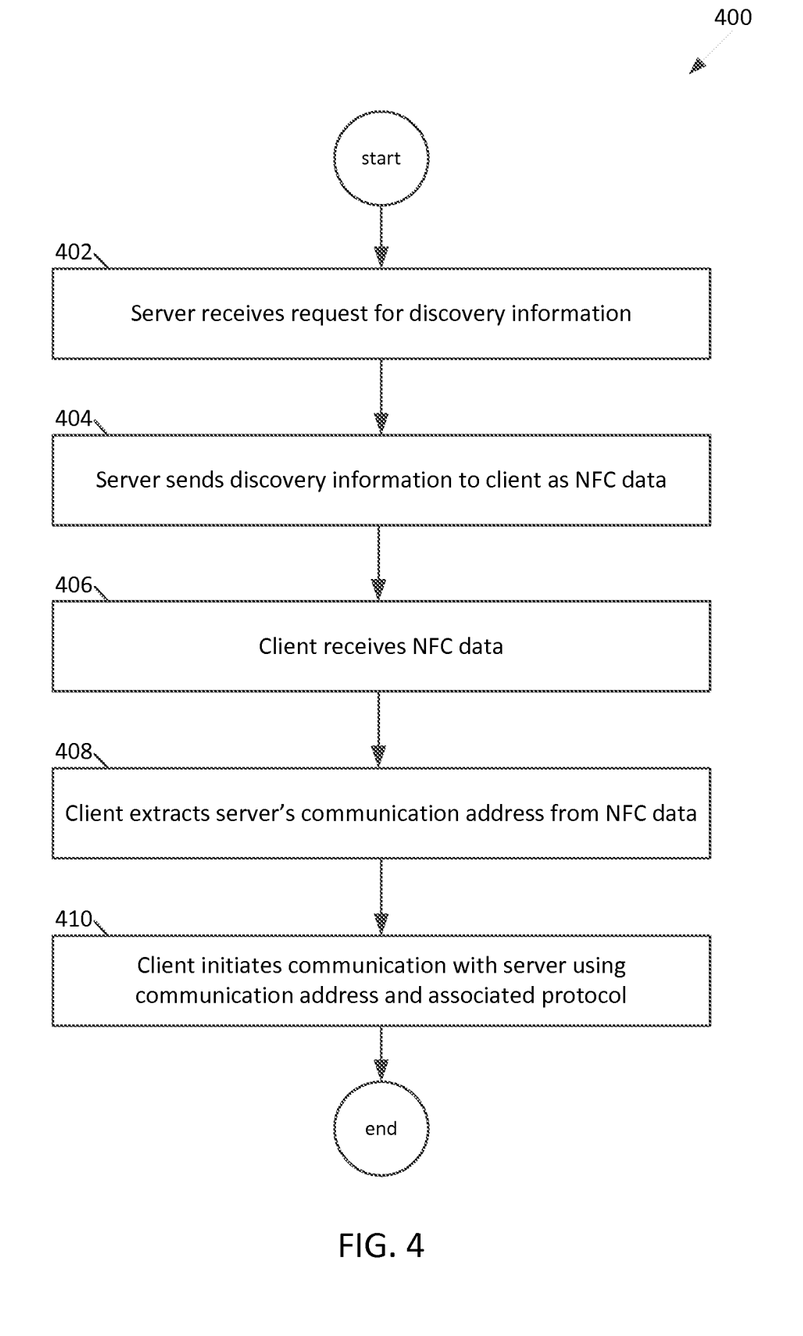
FIG. 4 illustrates a process of discovering nearby devices using an NFC-based protocol in accordance with one or more embodiments.

FIG. 4 illustrates a process 400 of discovering nearby devices using an NFC-based protocol in accordance with one or more embodiments. Process 400 can be implemented as, for example, computer program code encoded on a computer readable medium and executable by a processor of a computer system. NFC enables devices to communicate via radio when the devices are touched together or brought into close proximity of each other, e.g., within a few centimeters. In discovery via NFC, the discovery process can be initiated at the server, e.g., an Apple TV, printer, scanner, or computer, when the server receives a request to provide discovery information (block 402), either from the client 124 or from a user. In the case of a user request, the request can be a press of a button 118 on the server, or other type of user-initiated request, as described above. The client device can be, for example, an iPhone®, iPad®, iPod®, computer, or other device offering the client device discovery information to locate the service device for AirPrint™, AirPlay®, or other Bonjour-mediated discovery methods. In one or more embodiment, a user sets the device to find an AirPrint, AirPlay, or other service, and then waves the device near, or taps with the device, the server to initiate the discovery.

In one aspect, discovery information is not transmitted via NFC until an initial request has been received, because the NFC protocol model involves an initial request from a client to establish a connection, such as a client bumping their device against the server device. The discovery information is then sent to the requesting client as data in a NFC data exchange (block 404). The client receives the near-field communication data from the first device (block 406), and decodes the communication address from the near-field communication data (block 408). The client then initiates communication with the server using the communication address and associated protocol (block 410).

In one example, NFC discovery and the Discover Me button 118 can be used in a server room environment. Server computers are often mounted in rack hardware, with many server devices concentrated into a small space. Tracking the identity of specific server devices can be cumbersome or challenging in such an environment. If a device's network identity or name is changed, then existing physical labels that list the previous identity or name are incorrect, and should be changed, which involves manually updating each label. Administrators can press a Discover Me button 118 on the device they wish to discover, thereby easily identifying a device for which only the physical location is known.

Figure 5:
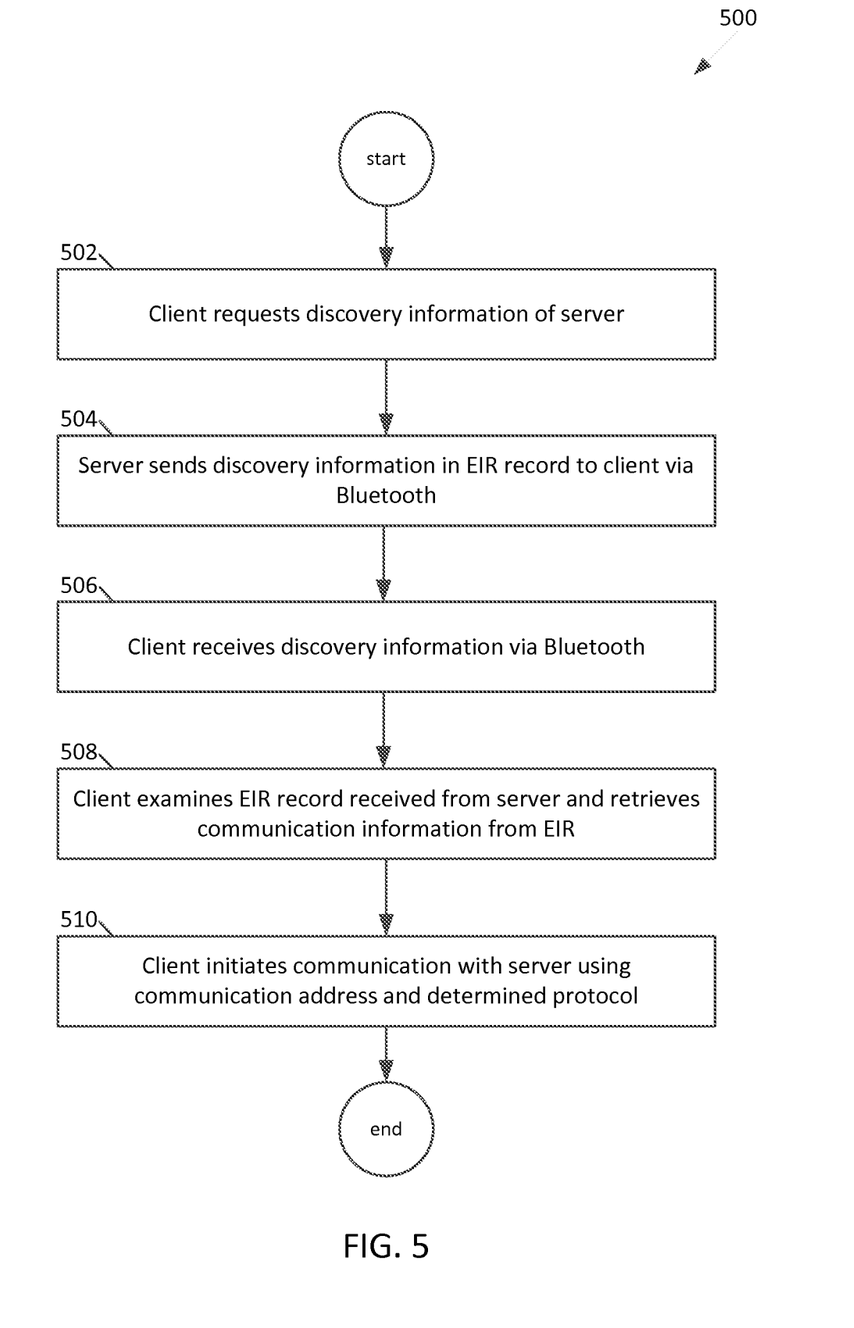
FIG. 5 illustrates a process of discovering nearby devices using a Bluetooth-based protocol in accordance with one or more embodiments.

FIG. 5 illustrates a process 500 of discovering nearby devices using a Bluetooth-based protocol in accordance with one or more embodiments. Process 500 can be implemented as, for example, computer program code encoded on a computer readable medium and executable by a processor of a computer system. In Bluetooth-based discovery, the discovery process can begin when the client requests discovery information of a server (block 502). In one aspect, discovery information is not sent until a client request is received, since Bluetooth has a greater range than some other communication protocols, and the discovery information is more likely to be intercepted by other users at greater distances who are not close enough to the server device to use it, and/or are less likely to be authorized to use the server device. The discovery information, including the communication address of the first device and/or a protocol to be used for subsequent communication between the client and server. The discovery information can be encoded in a Bluetooth format, e.g., in an EIR record, and transmitted to the second device via Bluetooth (block 504). In one aspect, the Bluetooth communication is performed without requiring that the first and second devices be paired. Avoiding the Bluetooth pairing process, in which the user performs steps that can involve providing a security code, can enhance the user experience because the discovery process can proceed quickly without additional user intervention.

The client device receives the Bluetooth data from the service device without a pairing (block 506), and extracts the communication address by decoding the discovery information from the Bluetooth data (block 508), e.g., by examining the EIR record in the received Bluetooth data and detecting the extra information in the EIR record, which includes the communication address and protocol. In one aspect, Bluetooth pairing is not required because the discovery protocol is used to identify but not communicate with the server device. In this aspect, communication with the server device is done via other protocols such as TCP/IP, HTTP, and so on. In another aspect, the discovery information can include an indication that the discoverer (e.g., client) can use Bluetooth to contact the discovered device (e.g., server) after establishing a pairing. In either aspect, the client initiates communication with the server using the determined protocol (block 510). In one example, a device that has a Discover Me button 118 or other demand-based discovery protocol can provide Bluetooth, NFC, and/or optical discovery protocols when discovery is requested, e.g., when the Discover Me button 118 is pressed.

Figure 6:
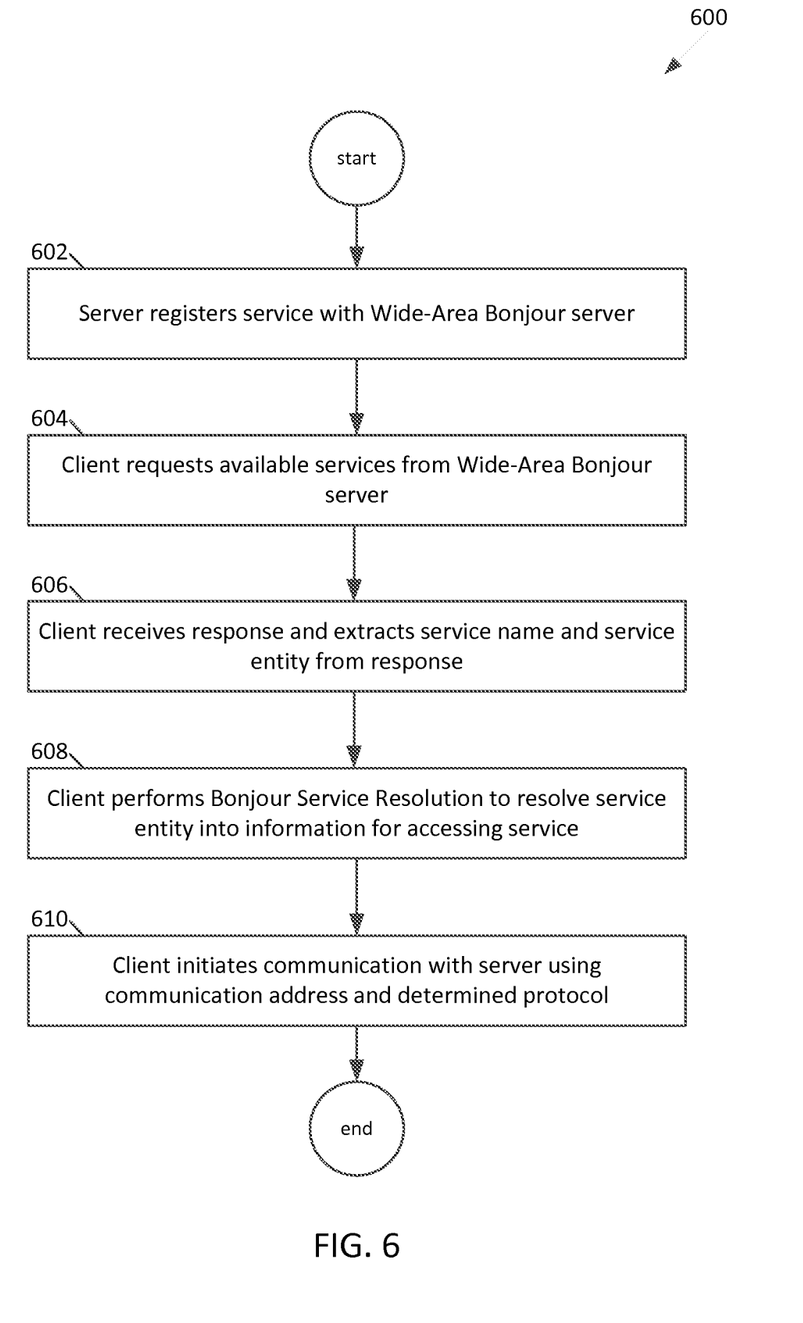
FIG. 6 illustrates a process of discovering nearby devices using a Wide-Area Bonjour-based protocol in accordance with one or more embodiments.

FIG. 6 illustrates a process 600 of discovering nearby devices using a Wide-Area Bonjour-based protocol in accordance with one or more embodiments. Process 600 can be implemented as, for example, computer program code encoded on a computer readable medium and executable by a processor of a computer system. A server that uses Bonjour can be given human-readable names for its services. A list of named service entities can be constructed to represent the discoverable services. Each named service entity includes both a service name and the human-readable name for the service. For example, 'http' is the name for HTTP web services. A server that uses Bonjour can be configured to register its services with a Wide-Area Bonjour server at block 602. Process 600 can be used by a server that is configured to register its services with a Wide-Area Bonjour server. In this Wide-Area Bonjour case, each named service entity need only include the service name and human-readable name. An example of a named service entity representing a web page is:

http._tcp PTR Employee Information Page._http._tcp.apple.com

A client discovers the named service entity by querying the Wide-Area Bonjour server at block 604 for available services. Upon receiving a response from the Wide Area server, the client extracts this named service entity at block 606. The client determines if the service is of interest by examining the encoded service name, e.g., 'http' in this example. If the client is interested in the service, the client then performs a standard Bonjour Service Resolution at block 608 to resolve the service entity, e.g., 'Employee Information Page._http._tcp.apple.com' in this example, into the information needed to access the service server, e.g., a communication address and protocol type, and communicates with the server using that information at block 610.

In one aspect, implementers of this discovery process may mutually agree to employ one or more methods of compression when encoding named service entities. This compression may include, but not be limited to, abbreviations, tokenizations, and other methods known to one of ordinary skill in the art.

Figure 7:
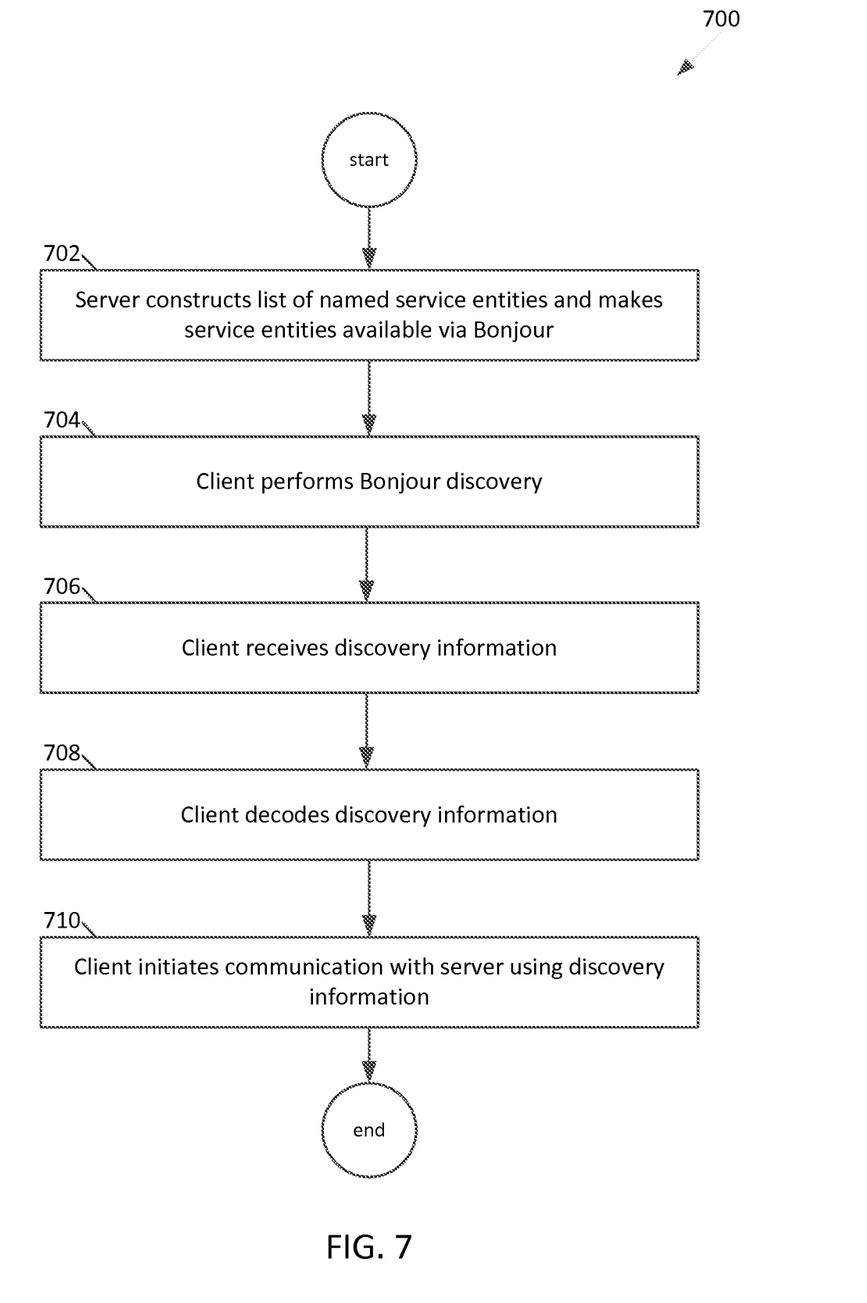
FIG. 7 illustrates a process of encoding and extracting discovery information using a local Bonjour-based protocol in accordance with one or more embodiments.

FIG. 7 illustrates a process 700 of encoding and extracting discovery information using a local Bonjour-based protocol in accordance with one or more embodiments. Process 700 can be implemented as, for example, computer program code encoded on a computer readable medium and executable by a processor of a computer system. As with process 600, a server that uses Bonjour can be given human-readable names for its services. At block 702, the server can construct a list of named service entities to represent the discoverable services, and makes the named service entities available via the Bonjour protocol. Each named service entity includes both a service name and the human-readable name for the service. For example, 'http' is the name for HTTP web services. Process 700 is meant to be performed by a server that does not register its services with a Wide-Area Bonjour server. Each named service entity constructed at block 702 includes the information ordinarily conveyed via Bonjour discovery. This conveyed information ordinarily includes a network address, a network port, and possibly additional information. Some protocols use additional information to qualify the exact service. For example, a web server can require the server-relative path to locate the web page. The server encodes this information in a manner mutually agreed on by implementers of this discovery process. An example for the web page described above with reference to FIG. 6 is:

_http._tcp SRV 10.11.12.13 80 path=/

The client performs Bonjour discovery, e.g., by sending discovery requests to one or more hosts on the network, at block 704. The client receives discovery information from the hosts(s) at block 706. The client decodes the discovery information at block 708. Upon decoding the discovery information, the client has the information it would receive after the completion of a Bonjour Service Resolution. The client then proceeds to contact the server using the decoded discovery information, such as a communication address and protocol, at block 710.

To set up a Bonjour service, the address of the server for that service name can be specified in a Bonjour service configuration (e.g., a configuration file) at block 602 for Wide-Area Bonjour, or at block 702 for local Bonjour. The server address and a path on the server can be associated with the service name in the file or registration. The server address, e.g., neinfo.example.com, is specified as a SRV record, and the path on the server, e.g., "/", is specified as a TXT record. A lookup can then be performed using the service name to find the server address previously associated with the server by the service configuration (block 608). For example, in Bonjour infrastructure (e.g., Wide Area) mode, the server may transmit the service name Employee Information Page-._http._tcp in the discovery information 116. The second device 124 can receive that service name and use it to look up the associated information described above, such as the server address and path on the server. In non-infrastructure (i.e., ad-hoc/local) mode, there is no lookup service, so the server sends the service name and the associated information in the discovery information 116, e.g., the server address 110 and the path on the server, which can be included in the server profile 108 (block 702). Once the client has extracted the communication address from the discovery information at block 708, the client initiates communication with the server using that communication address and the associated protocol at block 710 for local Bonjour, or block 608 for Wide Area Bonjour).

Figure 8:
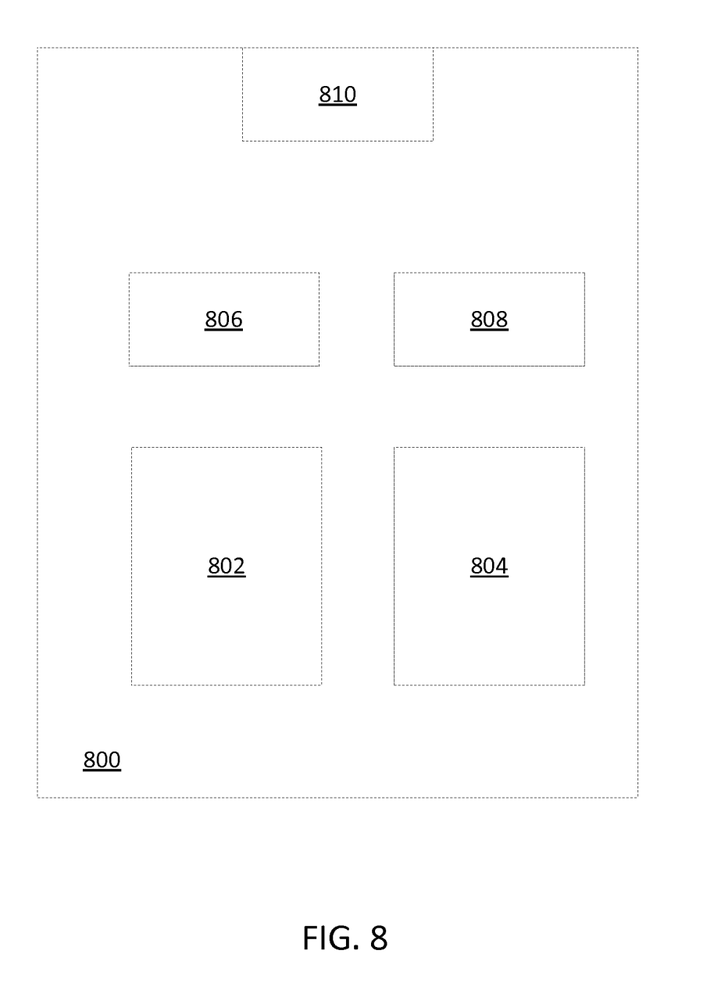
FIG. 8 shows a system block diagram of computer system used to execute the software of an embodiment.

FIG. 8 shows a system block diagram of computer system 800 used to execute the software of an embodiment. Computer system 800 includes subsystems such as a central processor 802, system memory 804, fixed storage 806 (e.g., hard drive), removable storage 808 (e.g., FLASH), and network interface 810. The central processor 802, for example, can execute computer program code (e.g., an operating system) to implement the invention. An operating system is normally, but not necessarily, resident in the system memory 804 during its execution. Other computer systems suitable for use with the invention may include additional or fewer subsystems. For example, another computer system could include more than one processor 802 (i.e., a multi-processor system) or a cache memory.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A method, comprising:
at a first device:
receiving a request to provide discovery information;
generating the discovery information, wherein the discovery information includes a communication address of the first device, and the communication address is associated with a first protocol;
identifying at least a second protocol and a third protocol available to the first device;
transmitting the discovery information to a second device using both the second and the third protocols, wherein:
the discovery information can be received by the second device only when the second device is located within an operating distance of the first device,
the second and third protocols are short-range protocols, and
the discovery information is transmitted to the second device without requiring the first device and the second device to be paired; and
establishing a communication session with the second device, wherein the communication session is initiated by the second device using the communication address and the first protocol.

2. The method of claim 1, wherein receiving the request to provide the discovery information comprises detecting a physical interaction with the first device by a user, and the physical interaction comprises the user pressing a button located on the first device.

3. The method of claim 1, wherein the discovery information is transmitted to the second device using each of the second protocol and the third protocol in succession.

4. The method of claim 1, wherein:
the second protocol differs from the third protocol, and
the discovery information is encoded in an Extended Inquiry Response (EIR) record.

5. The method of claim 1, wherein the communication address of the first device is extracted from the discovery information by the second device.

6. The method of claim 5, wherein:
the second protocol differs from the third protocol, and
the communication address is extracted from the discovery information by examining an Extended Inquiry Response (EIR) record by the second device.

7. The method of claim 1, wherein the discovery information includes profile data associated with the first device.

8. The method of claim 1, wherein the first protocol used to establish the communication session is specified in the discovery information.

9. A system, comprising:
a first device and a second device, wherein the first device comprises a first processor configured to cause the first device to:
receive a request to provide discovery information;
generate the discovery information, wherein the discovery information includes a communication address of the first device, and the communication address is associated with a first protocol;

identify at least a second protocol and a third protocol available to the first device;

transmit the discovery information to the second device using both the second and the third protocols, wherein:

the discovery information can be received by the second device only when located within an operating distance of the first device, the second and third protocols are short-range protocols, and the discovery information is transmitted to the second device without requiring the first device and the second device to be paired; and establish a communication session with the second device, wherein the communication session is initiated by the second device using the communication address and the first protocol.

10. The system of claim 9, wherein, to receive the request, the first processor further causes the first device to:

detect a physical interaction with the first device by a user.

11. The system of claim 9, wherein:

the second device comprises a second processor configured to cause the second device to:

extract the communication address of the first device from the discovery information; and initiate the communication session with the first device using the communication address and the first protocol.

12. The system of claim 11, wherein:

the second protocol differs from the third protocol, and the second processor further causes the second device to:

extract the communication address from the discovery information by examining an Extended Inquiry Response (EIR) record.

13. The system of claim 9, wherein:

the second protocol differs from the third protocol, and the discovery information is encoded in an Extended Inquiry Response (EIR) record.

14. The system of claim 9, wherein the discovery information includes profile data associated with the first device.

15. The system of claim 9, wherein the first protocol used to establish the communication session is specified in the discovery information.

16. A non-transitory computer readable medium configured to store instructions that, when executed by a processor included in a client device, cause the client device to carry out steps that include:

transmitting, to a server device located within an operating distance of the client device, a request for discovery information, wherein the discovery information includes a communication address of the server device, and the communication address is associated with a first protocol;

receiving the discovery information from the server device, wherein:

the discovery information is received using both a second protocol and a third protocol available to the server device, and the discovery information is received without requiring the server device and the client device to be paired;

extracting the communication address of the server device from the discovery information; and initiating a communication session with the server device using the communication address and the first protocol.

17. The non-transitory computer readable medium of claim 16, wherein:

the discovery information is generated by the server device.

18. The non-transitory computer readable medium of claim 16, wherein the first protocol used to initiate the communication session is specified in the discovery information.

19. The non-transitory computer readable medium of claim 16, wherein the discovery information includes profile data associated with the server device.

20. The non-transitory computer readable medium of claim 16, wherein the steps further include:

determining whether to initiate the communication session with the server device based on profile data associated with the server device.

\* \* \* \* \*